United States Patent [19]
Fuso

[11] 3,934,430
[45] Jan. 27, 1976

[54] ELECTRONIC INJECTION TIMING CONTROL FOR FUEL INJECTION PUMPS

[75] Inventor: Oscar Fuso, Turin, Italy

[73] Assignee: Fiat Societa per Azioni, Turin, Italy

[22] Filed: Mar. 6, 1974

[21] Appl. No.: 448,598

[52] U.S. Cl. ......... 64/25; 123/139 AP; 123/139 AD
[51] Int. Cl.² ........................ F02P 5/04; F16D 5/00
[58] Field of Search ... 123/139 AD, 148 E, 139 AP; 64/25

[56] References Cited
UNITED STATES PATENTS

| | | | |
|---|---|---|---|
| 3,521,611 | 7/1970 | Finch | 123/148 E |
| 3,592,177 | 7/1971 | Wehde | 123/139 AD |
| 3,603,112 | 9/1971 | Sola | 64/25 |
| 3,796,197 | 3/1974 | Locher et al. | 123/139 AP |
| 3,815,564 | 6/1974 | Suda et al. | 123/139 AP |

Primary Examiner—Wendell E. Burns
Assistant Examiner—Joseph Cangelosi
Attorney, Agent, or Firm—Sughrue, Rothwell, Mion, Zinn & Macpeak

[57] ABSTRACT

The injection timing of a fuel injection pump is controlled by displacement of a helical splined sleeve interconnecting a driving shaft and an injection pump drive shaft to vary the angle between the shafts. According to this invention the displacement of the sleeve is effected by a hydraulic actuator controlled by an electronic circuit which is responsive to a number of engine operating parameters and which receives a feedback signal from a detector, preferably magnetic, of the actual relative angular displacement between the shafts to ensure that the actual angle between the shafts is that required by the operating parameters.

1 Claim, 1 Drawing Figure

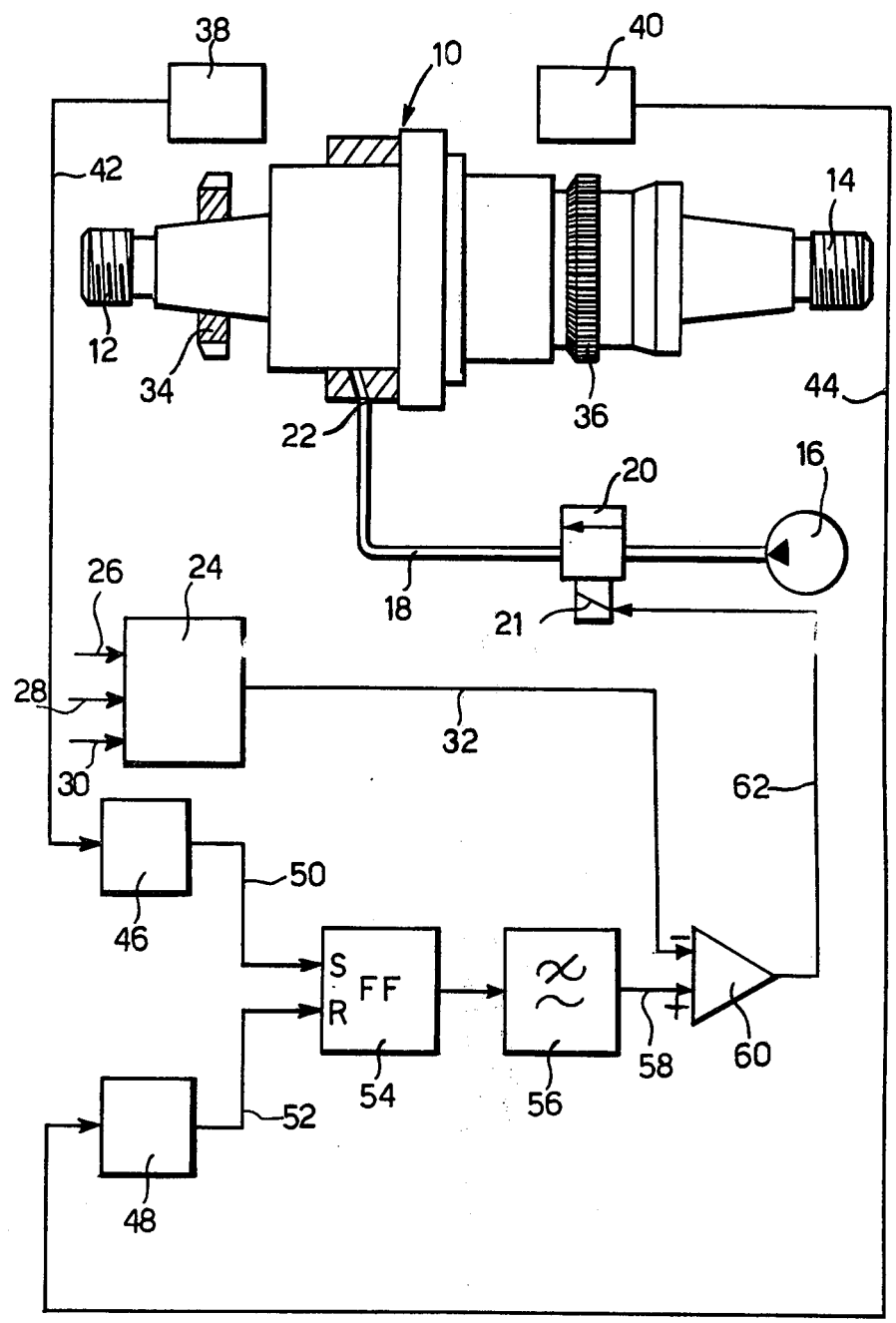

ELECTRONIC INJECTION TIMING CONTROL FOR FUEL INJECTION PUMPS

BACKGROUND OF THE INVENTION

This invention relates to a device for controlling the injection timing of fuel injection pumps in internal combustion engines. Such pumps are controlled to effect the injection of fuel into each cylinder of an internal combustion engine at a point in the cycle of the engine which is in advance of the top-dead-centre position of the respective piston in that cylinder, the amount of this advance being commonly expressed as the "advance angle" through which the engine crankshaft or flywheel rotates, after the injection of fuel into a cylinder, in order for the respective piston to reach the top-dead-centre position in that cylinder.

More particularly, the present invention relates to an electronic injection timing control device for a fuel injection pump in an internal combustion engine, in which the variation of the fuel injection timing is controlled in dependence upon a number of operating parameters of the engine.

In previously known fuel injection pumps the injection timing of the pump is controlled by a centrifugal governor responsive to the rotational speed of the shaft of the engine, the advance angle of the fuel injection being determined by the equilibrium position achieved by the governor. Such a centrifugal governor acts on the injection pump either directly or through a servo-control of the mainly hydraulic type. In modern engines with the need for low pollution of the atmosphere it is necessary to control the advance angle not only in dependence upon the rotational speed of the engine, but also in dependence upon other operating parameters, such as the temperature of the engine exhaust gases, the manifold pressure, or again, in the most elaborate systems, the chemical composition of the exhaust gases themselves.

For this purpose an electronic processing circuit is used, controlled by transducers which provide signals corresponding to the various parameters, the circuit giving an output signal which controls the variation of the fuel injection timing. This output signal must therefore be a function of the required advance angle of the fuel injection, and controls, usually through a proportional electrovalve, a metered flow of hydraulic fluid to an actuator which displaces axially a helically splined sleeve interconnecting the drive shaft of the pump shaft and a driving shaft, to vary the angle between these shafts until, when the optimum advance angle is reached, the parameters which control the system attain such values as to reduce the output signal to zero and therefore reduce or annul the flow of hydraulic fluid to the actuator.

This method of injection timing control is not very fast, due to the slow responses of the operating parameters of the engine to a variation of fuel injection timing, and moreover this method can cause instability in the system, because of the number of parameters involved and the sometimes strongly non-linear nature of their variations.

An object of this invention is to circumvent the aforementioned disadvantages by providing an electronic injection timing control device for a fuel injection pump which is of fast response and of high stability.

SUMMARY OF THE INVENTION

According to the present invention there is provided an injection timing control device for a fuel injection pump, comprising a pump drive shaft connected to a driving shaft through a helical splined sleeve coupling, an electronic circuit adapted to be responsive to a number of operating parameters of an associated engine to provide a first output signal, said circuit controlling hydraulic actuator means for effecting axial displacement of the sleeve to vary the relative angular displacement between the two shafts so as to vary the fuel injection advance angle of the pump as a function of the said parameters, detector means providing a second output signal representative of the relative angular displacement between the two shafts, and a differential amplifier which provides a third output signal representative of the difference between the first and second output signals, said third output signal being applied as a control signal to the hydraulic actuator means.

BRIEF DESCRIPTION OF THE DRAWING

A preferred embodiment of the invention will now be described, by way of non-limiting example, with reference to the accompanying drawing, which represents in purely schematic form an injection timing control device according to the invention.

DETAILED DESCRIPTION OF THE ILLUSTRATED EMBODIMENT

Referring to the drawing, a device 10 for varying the injection timing of a fuel injection pump (not shown) comprises a pump drive shaft 12 and a driving shaft 14. The two shafts 12, 14 are interconnected by a helical splined sleeve (not illustrated), in a known way, for example as described in U.S. Pat. No. 3,603,112.

A source 16 of hydraulic fluid under pressure, which may be constituted by the engine oil pump, feeds a conduit 18 through a proportional electrovalve 20, to apply a metered pressure to an inlet 22 of an hydraulic actuator of the injection timing control device 10. The sleeve coupling between the two shafts is displaced axially under control of the metered pressure applied to the inlet 22 to effect, through the helical splines of the sleeve, a relative angular displacement between the shafts 12, 14, varying the injection timing of the pump, as described in the said patent specification.

An electronic processing circuit 24, also of the known type, is provided with a number of inputs 26, 28, 30, upon which are received respective signals derived from different transducers (not shown), representing different physical parameters associated with the operation of the engine, as described previously and as known in the art. The electronic circuit 24 processes the input signals to provide a first output signal on a line 32, representing the required fuel injection advance angle at any given instant.

According to this invention, the shafts 12 and 14 of the injection timing control device 10 are each connected to a respective toothed wheel 34, 36, each for example with thirty-three teeth, of ferromagnetic material. A respective magnetic pick-up 38, 40 is associated with each of the toothed wheels 34, 36 to detect the reluctance variations resulting from the rotation of the respective toothed wheels. The magnetic pick-ups 38, 40 provide, on respective output lines 42, 44, respective pulse trains comprising one pulse for each passage of a tooth past the respective pick-up.

The two pulse trains on the lines 42, 44 are squared or clipped in respective monostable multivibrators 46, 48. The outputs 50 and 52 of the multivibrators 46, 48 control respectively the "set" and "reset" inputs of a flip-flop 54, the output of which is filtered by a low-pass filter 56 to obtain a substantially continuous (D.C.) output voltage, constituting a second output signal.

The mounting of the pick-ups 38, 40 is such that, when the engine is stationary, they are in correspondence with a tooth of the respective toothed wheels. Therefore, when the engine is started, the sequences of pulses on the lines 50 and 52 set and reset alternately the flip-flop 54, which will spend more time on one or in the other of its states according as a given part of one of the toothed wheels 34, 36 (and therefore of its associated rotating shaft 12, 14) is in advance of or retarded with respect to the corresponding part of the other wheel.

Therefore the D.C. or continuous voltage component of the output signal of the flip-flop 54 will be proportional to the relative angular displacement between the two shafts 12, 14 of the device 10 at any given instant. The output voltage of the low-pass filter 56, that is, the second output signal, on the line 58, represents therefore the actual fuel injection advance angle of the device 10 at that instant.

The output voltage on the line 58, representing the actual fuel injection advance angle, and the first output signal on the line 32, representing the desired advance angle, are compared in a differential amplifier 60, which provides a third output signal representative of the difference between the output signal on the line 32 and the output signal on the line 58. This difference output signal controls the solenoid 21 of the electrovalve 20 through a line 62.

It will be apparent that, by comparing the first and second output signals from the electronic processing circuit 24 and from the low-pass filter 56 respectively, one obtains a high rate of response in the ignition timing control of the device 10, avoiding on one hand the response delay of the prior art devices, on the other hand the instability or "hunting" due to over-corrections of advance, with successive countercorrections, which occurred with the prior art devices when attempts were made to shorten the response time beyond certain limits.

The use of a flip-flop 54 to compute the difference between the signals of the pick-ups 38, 40 gives an optimum protection from noise, and furthermore allows the system to maintain a given condition indefinitely whenever the relative angular displacement between the shafts 12, 14 is kept constant for long periods of time.

What is claimed is:

1. A fuel injection system comprising:
  - an injection pump having a pump drive shaft;
  - a driving shaft;
  - a helical sleeve coupling interconnecting said pump drive shaft and said driving shaft;
  - electronic circuit means adapted to be responsive to a number of operating parameters of an associated engine to provide a first output signal;
  - hydraulic actuator means controlled by said circuit for effecting axial displacement of said sleeve to vary the relative angular displacement between said shafts and thereby vary the fuel injection advance angle of said pump as a function of the said parameters;
  - a first ferromagnetic toothed wheel attached to said pump drive shaft so as to rotate therewith;
  - a second ferromagnetic toothed wheel attached to said driving shaft so as to rotate therewith, said second ferromagnetic wheel having the same number of teeth as said first ferromagnetic tooth wheel;
  - first magnetic pick-up means disposed adjacent said first ferromagnetic wheel to generate a signal proportional to the rotation of said wheel;
  - second magnetic pick-up means disposed adjacent said second ferromagnetic wheel to generate a signal proportional to the rotation of said second wheel;
  - means for deriving a second output signal proportional to the relative angular displacement of the pump drive shaft and the driving shaft comprising first and second monostable multivibrators having their inputs connected to said first and second magnetic pick-up means respectively, a flip-flop having "set" and "reset" inputs connected to the outputs of the first and second monostable multivibrators, and a low-pass filter means connected to the output of the flip-flop to provide the second output signal;
  - differential amplifier means having its inputs connected to said electronic circuit means and said low pass filter means to provide a third output signal representative of the difference between said first and second output signals, said third output signal being a control signal to said hydraulic actuator means.

* * * * *